March 6, 1928.

L. C. BLOMSTROM 1,661,163

LOADING BLOCK FOR ASSEMBLING HALF BEARINGS FOR MACHINING

Filed Aug. 6, 1927

INVENTOR
Lowell C. Blomstrom
BY
ATTORNEYS

Patented Mar. 6, 1928.

1,661,163

UNITED STATES PATENT OFFICE.

LOWELL C. BLOMSTROM, OF DETROIT, MICHIGAN, ASSIGNOR TO FEDERAL MOGUL CORPORATION, OF DETROIT, MICHIGAN, A CORPORATION OF MICHIGAN.

LOADING BLOCK FOR ASSEMBLING HALF BEARINGS FOR MACHINING.

Application filed August 6, 1927. Serial No. 211,086.

This invention relates to loading blocks for preparing semi-cylindrical or half bearings for accurate positioning in the dummies or shop forms on which they are mounted preparatory to final machining, and has for its object an improved organization of parts by means of which this operation may be accurately and rapidly performed.

It is the practice to preliminarily mount the half-bearings upon cylindrical or tubular dummies or adapters, so that when a barrel or crate of the articles has been thus prepared, it may be moved to position conveniently adjacent the machine that is to perform the next shop operation, from which each unit can be easily and quickly picked out by the operator for mounting upon a rotatable spindle or other shop equipment. It is, however, highly important that these bearings be very accurately mounted upon the dummies both with reference to them, and, in the case of half bearings where two are mounted upon the dummy at once, with reference as well to the ring which holds them clamped about the dummy or spindle-engaging shaft. The apparatus herein disclosed makes possible both speed and accuracy in these respects.

A indicates a base or table, through which extend upwardly bolts or similar members B, which serve to anchor in position the outer shell C of the loading device. This shell, it will be observed, has two concentric and supporting top surface portions as D and F, preferably spaced somewhat from one another by the cut-away or trough portion E.

Figure 2:
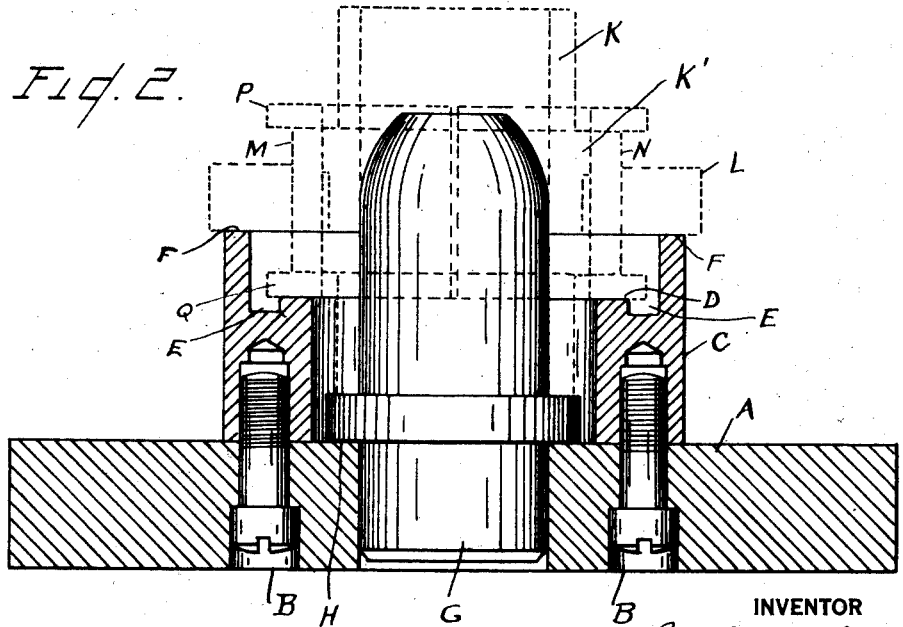
Figure 2 is an elevational view partly in section, with the removable parts indicated by dotted circles in Figure 1 similarly indicated in position in this view, which is taken along the line 2—2 of Figure 1.

Also supported by the block concentrically with respect to the outer shell C is the stud or pillar G, which may if desired be provided with flanges H, which rest upon that portion of the table intermediate the body of the stud G and the wall or shell C. The external diameter of this stud is such that the dummy K will just fit over it; the dummy or adapter is of such a length that its top edge lies appreciably about the top of the stud G. When two half bearings as M and N are to be mounted upon the dummy they are held about the projections K' on the dummy by means of the separable or split ring L. From an examination of Figure 2 it will be observed that the height and thickness of the several parts are so proportioned that when the lower flanges of the bearing shells M and N are rested upon the heading surfaces D, and when the split ring L is rested upon the surface F, the middle line of the split ring, viewed horizontally, is just mid-way between the top and bottom flanges P and Q respectively of the bearings and also mid-way between the top and bottom ends of the dummy K.

It is obvious that before the tightening means on the split ring L is brought into action to force the half bearings M and N into tight relations about the adapter or dummy K, which has first been placed in position over the stud G, the easiest procedure, even for a careless operator, is to allow the lower flanges Q of the half bearings to rest upon the surfaces D and to rest the split ring upon the higher surface F. When, however, the assembly has been thus brought about, it causes the accurate positioning of the two matched half bearings mid-way between the ends of the dummy K. The temporarily assembled structure may then be easily and quickly removed and tossed into the bin or container for positioning upon the machine spindle when desired. The operative parts of this latter and the degree of cut desired upon the bearing shell having been the determining factors regulating the height of the shell and of the loading device and the relative heights of its supporting surfaces D and F, it is obvious that the individual units when thus assembled and placed in quantity in a storage bin or container can be relied upon to be accurately and uniformly positioned with regard to the dummy or spindle-engaging shell K.

Figure 1:
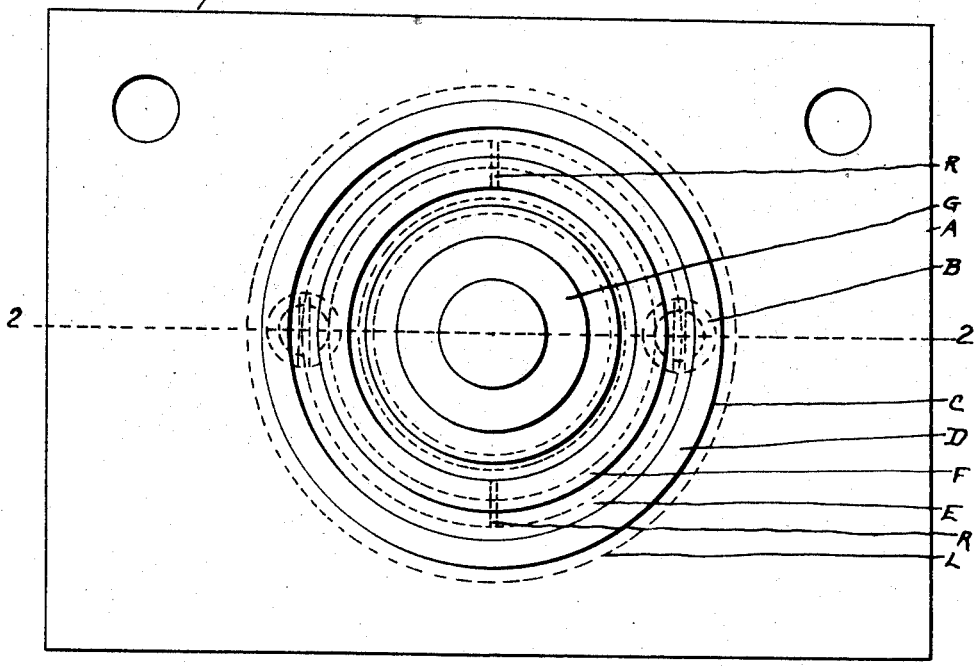
Figure 1 is a plan view of the base or table with the outer or locating shell and the central stud of the device shown in full circles, while such removable parts as the dummy, the individual shell, and the bearing are shown in dotted lines.

It is to be understood that by the term "half-bearings" I mean to include herein both full halves of 180° curvature, and slightly "short" shells, whose straight edges, when the two halves are assembled about the dummy or adapter, do not quite touch, as indicated at R in Figure 1.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. A loading device for bearings, comprising a supporting base, a central locating stud adapted to be removably engaged by a shell-supporting dummy, and a concentrically disposed encircling shell having a plurality of supporting surfaces whereon one edge of the bearing and its temporary encircling and clamping ring may be respectively rested at desired elevations relatively to the middle lengthwise point of the dummy and of the bearing shells respectively.

2. A loading device for bearings, comprising a central stud and a spacedly encircling wall member having supporting top surfaces of suitable proportional height, the central stud being adapted to temporarily support a spindle-engaging dummy and the supporting surfaces of said wall member and in turn being adapted to support the lower edges of a bearing shell and of a shell-holding ring respectively at desired assembled elevations relatively to one another and to the spindle-engaging dummy.

3. A loading device for half bearings and their temporarily encircling and clamping rings and supporting dummies, comprising a locating stud over which the dummy is adapted to be positioned, and a coaxially positioned surrounding element having concentrically positioned supporting platforms whereon the bearing shells and their temporary enclosing ring are adapted to be rested, the height of each platform relatively to the length of the dummy and of the bearing shell and to the thickness of the enclosing ring being such as to accurately locate the two latter in desired position relatively to the lengthwise extent of the dummy.

4. A loading device for half bearings and their temporary encircling rings and supporting dummies, comprising a central locating stud about which the dummies are adapted to be positioned, and supporting platforms of calculated diverse height relatively to the length of the dummy, the length of the bearing shell, and the thickness of the encircling ring respectively, upon which the bearing shell and the encircling ring are adapted to be rested, thereby accurately positioning them relatively to the lengthwise extent of the dummy.

5. Means for locating bearing shells in accurate position on a spindle-engaging adapter, comprising a central locating stud over which the adapter is adapted to be temporarily positioned, and a coaxially positioned supporting member provided with diversely positioned platforms of ascertained proportional height relatively to the length of the adapter and of the bearing shells respectively, whereon the shells and their temporary enclosing ring may be respectively rested, thereby locating both of the latter in the exact position desired relatively to the lengthwise extent of the adapter.

6. Means for accurately locating a bearing shell and its temporary enclosing ring in desired position relatively to the ascertained length of a supporting dummy, comprising a central stud over which the dummy is adapted to be positioned, and a plurality of supporting platforms coaxially positioned thereabout, whereon the shells and their temporary encircling ring are adapted to be rested preparatory to their clamping assemblage, the height of said platforms relatively to one another and to the length of the dummy being such as to effect the accurate positioning of the shell and its encircling ring midway between the ends of the dummy.

In testimony whereof, I sign this specification.

LOWELL C. BLOMSTROM.